United States Patent
Di Giovine

(12) 
(10) Patent No.: US 9,664,337 B2
(45) Date of Patent: May 30, 2017

(54) APPARATUS FOR TRANSPORTING A DEVICE ALONG A TOWER

(71) Applicant: COMBUSTION AND ENERGY S.R.L., Oggiono (IT)

(72) Inventor: Vincenzo Di Giovine, Lecco (IT)

(73) Assignee: COMBUSTION AND ENERGY S.R.L., Oggiono (IT)

( * ) Notice: Subject to any disclaimer, the term of this patent is extended or adjusted under 35 U.S.C. 154(b) by 172 days.

(21) Appl. No.: 14/641,440

(22) Filed: Mar. 9, 2015

(65) Prior Publication Data

US 2015/0252943 A1 Sep. 10, 2015

(30) Foreign Application Priority Data

Mar. 10, 2014 (IT) .............................. PD2014A0056

(51) Int. Cl.

| | |
|---|---|
| *F16L 3/00* | (2006.01) |
| *F16M 13/02* | (2006.01) |
| *F16L 3/01* | (2006.01) |
| *B66B 7/02* | (2006.01) |
| *B66B 9/187* | (2006.01) |

(52) U.S. Cl.
CPC ........... *F16M 13/022* (2013.01); *B66B 7/022* (2013.01); *B66B 9/187* (2013.01); *F16L 3/01* (2013.01)

(58) Field of Classification Search
USPC ........................................................ 248/59
See application file for complete search history.

(56) References Cited

U.S. PATENT DOCUMENTS

| | | | | |
|---|---|---|---|---|
| 3,908,801 A | * | 9/1975 | Pohlman | B66B 5/04 182/103 |
| 4,579,522 A | | 4/1986 | MacDonald | |
| 5,291,367 A | * | 3/1994 | Rajewski | E21B 41/0071 361/247 |
| 5,429,496 A | * | 7/1995 | Stephens | F23G 7/085 431/202 |
| 5,803,726 A | * | 9/1998 | Bacon | F23G 7/085 431/202 |
| 5,964,316 A | * | 10/1999 | Roy | A62B 35/0068 182/3 |
| 8,033,361 B2 | * | 10/2011 | Maurer | B66B 7/022 104/126 |
| 2008/0310948 A1 | * | 12/2008 | Borgen | B65G 47/912 414/792.8 |

(Continued)

FOREIGN PATENT DOCUMENTS

| | | |
|---|---|---|
| GB | 1247571 A | 9/1971 |
| GB | 2025363 A | 1/1980 |

*Primary Examiner* — Monica Millner
(74) *Attorney, Agent, or Firm* — Mark M. Friedman

(57) ABSTRACT

Apparatus for transporting a device along a tower, which comprises a rail susceptible of being fixed to a tower and extended according to a substantially rectilinear guide direction, and a trolley slidably constrained to the rail and adapted to support a device to be transported provided with at least one power cable. The rail comprises at least one hollow shaped profile with elongated form, which is longitudinally extended according to the guide direction between a lower edge thereof and an upper edge thereof, and is provided with an internal surface which defines a guide seat in which the trolley is slidably housed and in which the power cable of the device is susceptible to pass.

10 Claims, 16 Drawing Sheets

(56) References Cited

U.S. PATENT DOCUMENTS

2012/0183381 A1* 7/2012 Gordon ................ B60P 1/4428
  414/540
2012/0228880 A1* 9/2012 Aarhus .................. F03D 1/003
  290/55

* cited by examiner

APPARATUS FOR TRANSPORTING A DEVICE ALONG A TOWER

DESCRIPTION

Field of Application

The present finding refers to an apparatus for transporting a device along a tower, according to the preamble of the main claim.

The present apparatus is intended to be advantageously installed on towers (e.g. on flare stacks of petrochemical plants, on smokestacks, on pylons, etc.) in order to transport devices, such as light-emitting devices, smoke detection devices, devices for igniting the flame of a flare stack, etc.

In particular, the present apparatus is intended to be employed for transporting the aforesaid devices onto the top of the tower and for bringing such devices to the ground, without requiring an operator to be on the top of the tower itself.

STATE OF THE ART

Petrochemical plants, especially refineries, are provided with high smokestacks (with height often greater than one hundred meters), in the technical jargon of the field termed "flare stacks", into which the gases produced by the oil refinery processes are conveyed in order to be burned, so as to avoid dispersing the hydrocarbons in the environment.

In particular, on the top of the smokestack, an ignition device (termed "pilot light") is positioned which continuously produces a flame adapted to burn the gases that are conveyed into the smokestack.

In addition, in proximity to the top of the smokestack, light-emitting devices are usually positioned in order to indicate the presence of the smokestack to aircraft, such as airplanes and helicopters.

Diagnostic devices are also installed on the top of the smokestack, such as smoke detectors.

The smokestack of the plant must always be active in order to ensure the disposal of the gases and ensure the necessary safety conditions.

Therefore, the execution of the operations of maintenance of the devices (pilot light, light-emitting devices, smoke detectors) directly on the top of the smokestack results excessively dangerous and costly, in particular due to the frequent development of strong flares and the considerable height.

For the purpose of at least partly resolving this drawback, apparatuses for transporting devices along smokestacks have been known for some time; such apparatuses comprise a trolley bearing the device mounted thereon and actuatable to slide on a vertical rail placed along the entire height extension of the smokestack. In particular, the trolley can be actuated for transporting the device to the top smokestack (where the device is intended to operate) and to bring it back to the ground after having executed the maintenance or repair operations without requiring the presence of operators on the top of the smokestack.

For example, an apparatus is known for transporting an ignition device (pilot light) onto the top of a smokestack of a refinery, which comprises a pair of rails, made of iron or steel, fixed to the smokestack and a trolley (bearing the pilot light mounted thereon) provided with multiple small wheels slidably engaged with the corresponding aforesaid rails.

In addition, the apparatus comprises a pulley for moving the trolley provided with a pulley, fixed to the top of the smokestack, and with a rope wound around the pulley and having one end fixed to the trolley and the other end connected to an actuation winch arranged at the base of the smokestack itself.

The pilot light comprises a nozzle, intended to be positioned above the discharge mouth of the top of the smokestack and adapted to deliver a flame for burning the gases expelled from the mouth of the smokestack itself.

The pilot light is supplied by a flexible gas supply cable, which has one end connected to the aforesaid nozzle and the other end connected to a gas supply source placed on the ground.

In addition, the pilot light comprises an ignition device, e.g. via electric arc, placed at the nozzle and power supplied by an electrical cable connected to an electrical power supply and control unit placed on the ground.

The supply cable for the gas and the electrical cable for the pilot light have length substantially equal to the height of the smokestack (hence for example even 100 meters) and are unwound along the entire smokestack when the ignition device is brought by the trolley onto the top of the smokestack itself.

The main drawback of the apparatus of known type briefly described above is due to the fact that the cable of the gas and the electrical cable of the pilot light are subjected to weathering agents, such as in particular strong wind gusts, which strongly shake the cables, in particular pushing them to impact against the smokestack or the rails of the apparatus, therefore facilitating the breakage of the cables themselves.

A further drawback is due to the fact that, when the trolley is brought onto the top of the smokestack, the entire weight of the pilot light and the trolley itself is supported by the rope of the movement pulley, which is therefore subjected to considerable stress that facilitates the breakage thereof.

In addition, also the rope of the pulley is subjected to the weathering agents (wind, rain, etc.) that easily lead to the wear and damage thereof.

A further drawback of the above-described apparatus of known type consists of the fact that it requires high attainment costs, since it is necessary to manufacture iron or steel rails of considerable length (substantially equal to the height of the smokestack).

The patent GB 1247571 describes an apparatus for transporting an elevator cage along a tower; such apparatus comprises a rail fixed to the tower and a trolley slidably constrained to the rail and bearing the elevator cage fixed thereto.

More in detail, the rail comprises multiple tubular profiles arranged in succession (one after the other), within which the trolley is susceptible to slide in order to raise and lower the cage along the tower.

The apparatus described in the patent GB 1247571 is not suitable for transporting devices provided with power cables (such as ignition devices, light-emitting devices, etc.) since, in particular, it does not at all resolve the problem of damage and breakage of the power cables.

PRESENTATION OF THE INVENTION

In this situation, the main object of the present invention is therefore to overcome the drawbacks manifested by the solutions of known type, by providing an apparatus for transporting a device along a tower that allows protecting the power cables of the devices to be transported.

Further object of the present invention is to provide an apparatus for transporting a device along a tower that allows protecting the drive and actuation ropes of the apparatus itself.

Further object of the present invention is to provide an apparatus for transporting a device along a tower that is structurally simple and inexpensive to manufacture.

Further object of the present invention is to provide an apparatus for transporting a device along a tower that is capable of functioning in a fully efficient manner.

BRIEF DESCRIPTION OF THE DRAWINGS

The technical characteristics of the invention, according to the aforesaid objects, can be clearly found in the contents of the below-reported claims and the advantages thereof will be clearer from the following detailed description, made with reference to the enclosed drawings, which represent several merely exemplifying and non-limiting embodiments of the invention, in which:

DETAILED DESCRIPTION OF A PREFERRED EMBODIMENT

Figure 1:
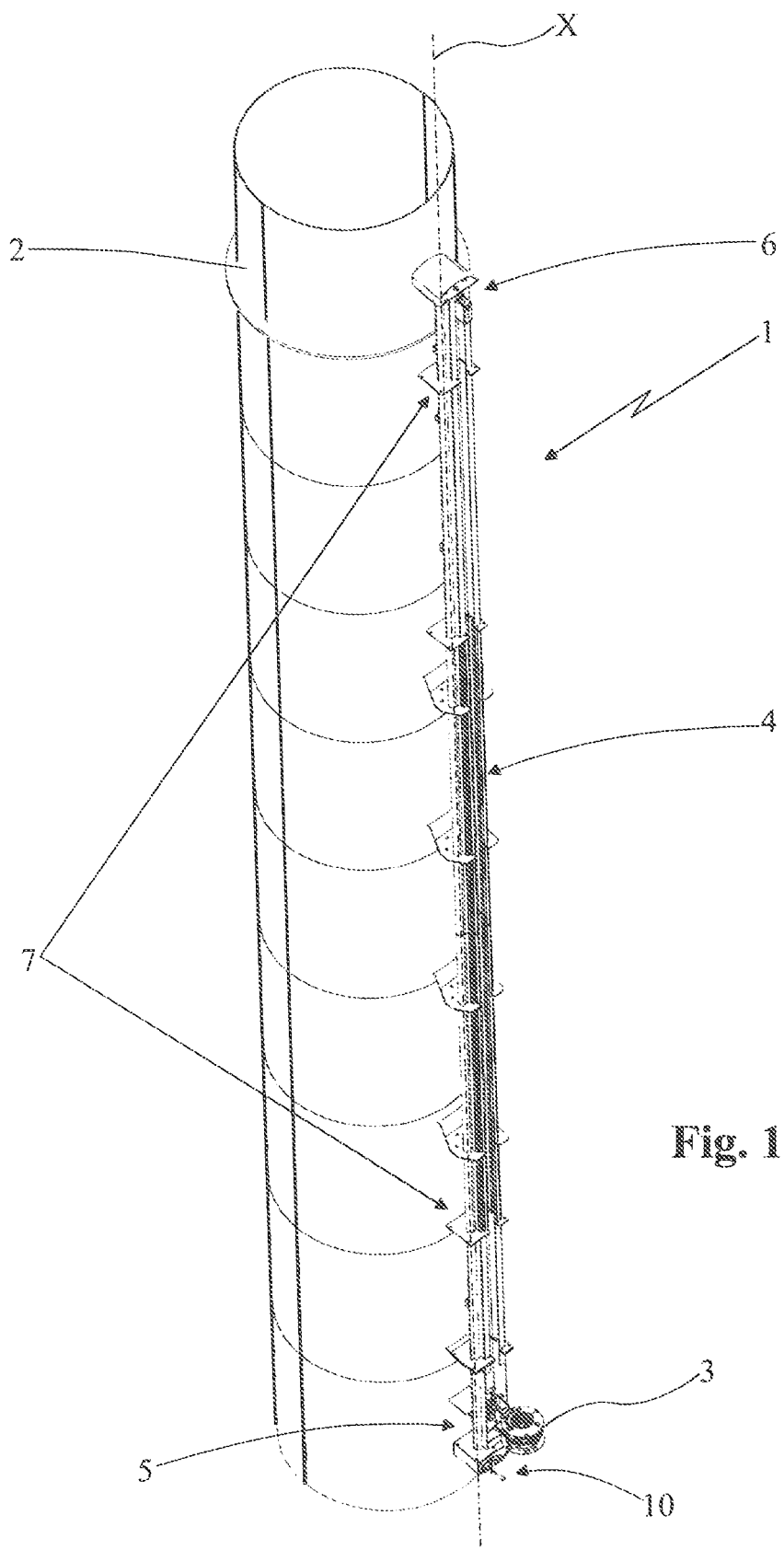
FIG. 1 shows a perspective view of the apparatus for transporting a device along a tower, subject of the present invention, in accordance with a first embodiment.

With reference to the set of drawings, reference number 1 indicates overall the apparatus for transporting a device along a tower, subject of the present finding.

The present apparatus 1 is intended to be advantageously installed on towers 2 with very high height (which for example can even reach 100 meters height), such as flare stacks of petrochemical plants, smokestacks of power production plants, pylons, etc., and in general on high structures whose top is not easily reachable by operators.

In particular, the present apparatus 1 is intended to be employed for transporting devices 3 (such as light-emitting devices, smoke detection devices, flame ignition devices, etc.) onto the top of the tower 2 and for bringing such devices 3 back to the ground, without an operator having to be on the top of the tower 2 itself.

Figure 2:
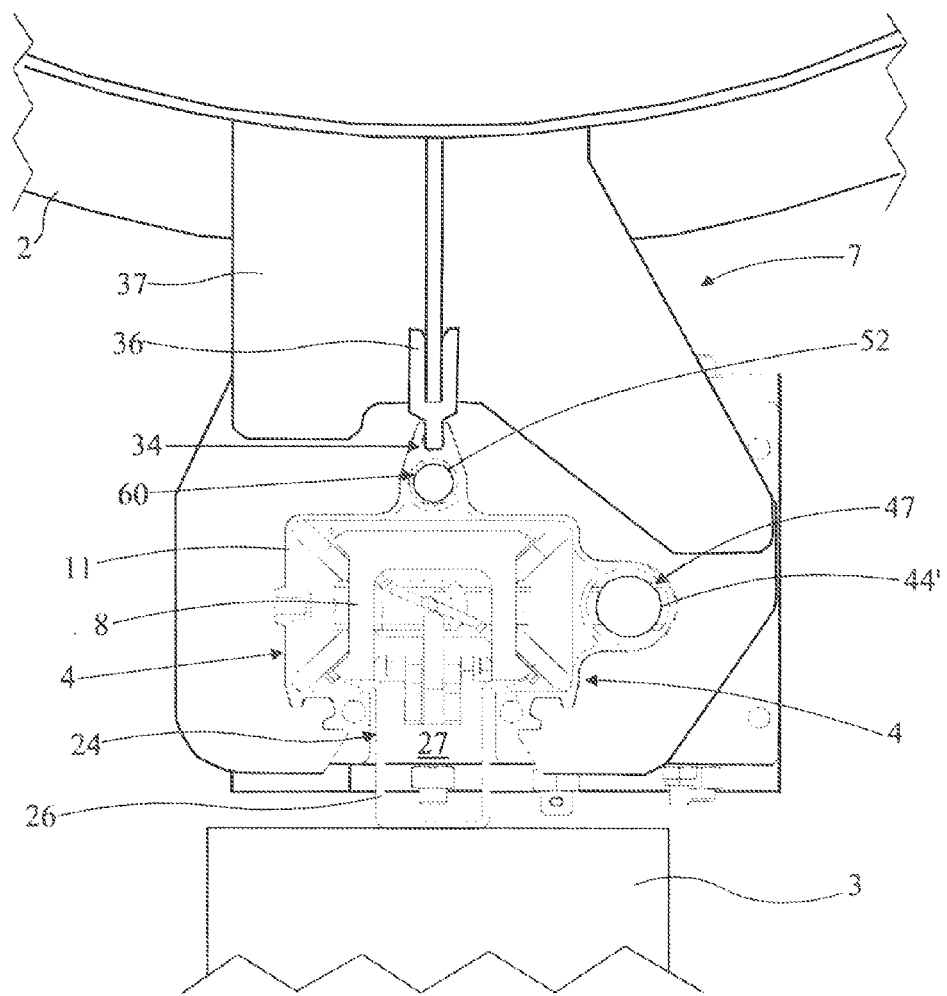
FIG. 2 shows a cross section view of the apparatus illustrated in FIG. 1.
Figure 3:
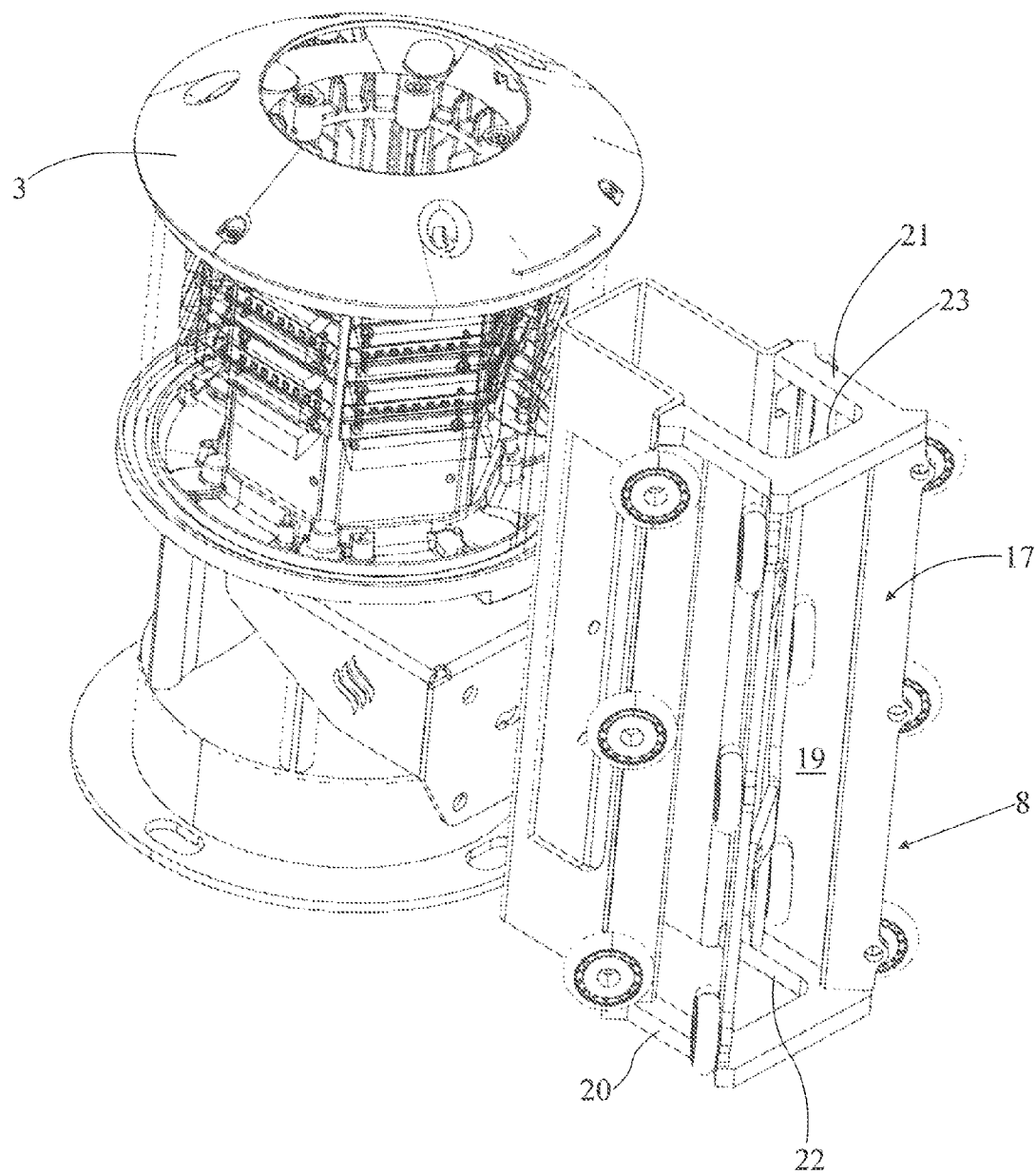
FIG. 3 shows a detail of the apparatus illustrated in FIG. 1 relative to a trolley with the device to be transported mounted thereon.

In accordance with a first embodiment illustrated in FIGS. 1-3, the present apparatus 1 is employed for transporting, to the top of the tower 2, a light-signaling device adapted to signal the presence of the tower 2 to aircraft such as airplanes and helicopters.

Figure 4:
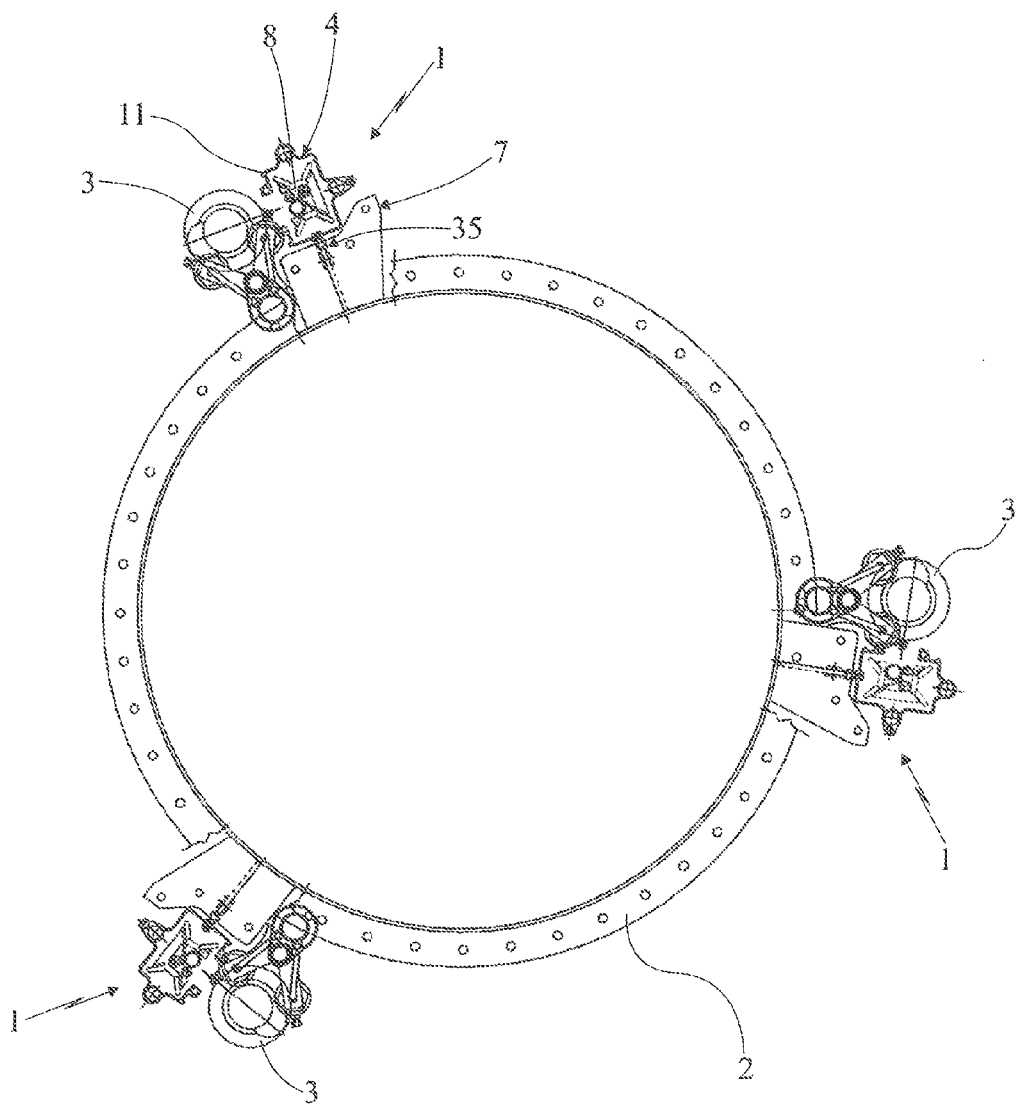
FIG. 4 shows a top plan view of a tower on which multiple apparatuses, subject of the present invention, are mounted in accordance with a second embodiment.
Figure 5:
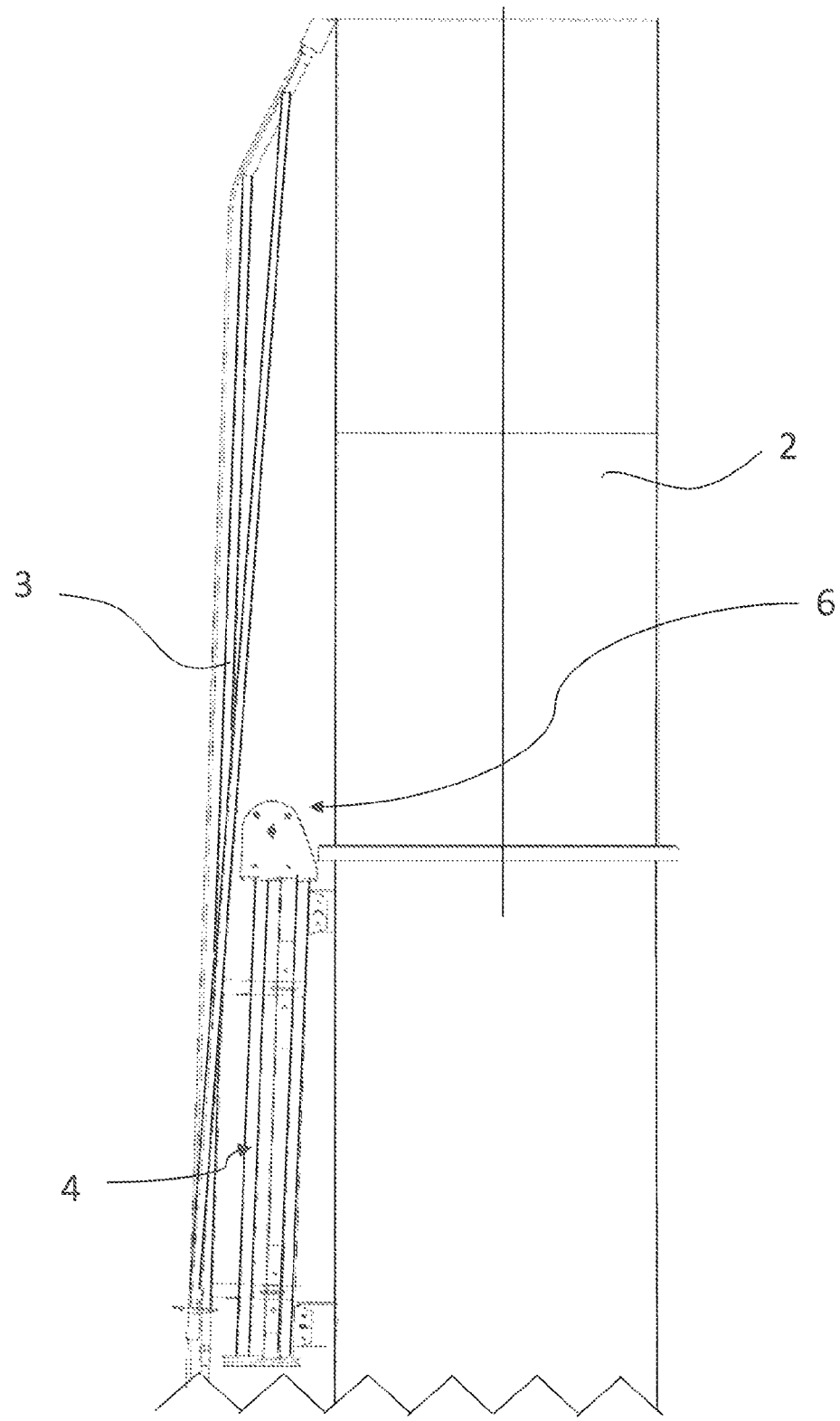
FIG. 5 shows a side view of a detail of the apparatus illustrated in FIG. 4, relative to the portion of the apparatus intended to be arranged at the top of the tower.

In accordance with a second embodiment illustrated in FIGS. 4-5, the present apparatus 1 is employed for transporting a flame ignition device (in the technical jargon of the field termed "pilot light") onto the top of the tower 2, for example constituted by the flare stack of a refinery.

Of course, without departing from the scope of the present invention, the present apparatus 1 can be used for transporting to the top of a tower 2 any one device 3, such as smoke detection devices, surveillance devices, etc.

According to the present invention, the apparatus 1 comprises a rail 4 which is extended according to a guide direction X (in particular substantially rectilinear and vertical) between a lower end 5 thereof and an upper end 6 thereof. The rail 4 is provided with fixing means 7 (described in detail hereinbelow) by means of which it is susceptible to be fixed to the tower 2, with the upper end 6 of the rail 4 placed at the top of the tower 2 itself.

In particular, with reference to the particular embodiments illustrated in the enclosed figures, the upper end 6 of the rail 4 is positioned below the top of the tower 2, preferably spaced from such top e.g. by about 3-5 meters.

Still with reference to the embodiments illustrated in the enclosed figures, the rail 4 is substantially extended along the entire height of the tower 2 and has the lower end 5 thereof placed at the base of the tower 2 itself in order to allow bringing the device 3 back to the ground (as explained hereinbelow).

In accordance with a different non-illustrated embodiment, the rail 4 is arranged along a final upper section of the tower 2, e.g. the final 15-20 meters from the top of the tower 2, being extended for example starting from the height of the tower 2 where the final operator-accessible positions are arranged. In accordance with the embodiment, the lower end 5 of the rail 4 is arranged at the aforesaid operator-accessible positions.

According to the invention, the apparatus 1 comprises a trolley 8 slidably constrained to the rail 4 and adapted to support the device 3 to be transported along the tower 2.

More in detail, the device 3 to be transported is provided with one or more power cables 9 which allow the operation of the device 3 itself.

In accordance with the first embodiment illustrated in FIGS. 1-3, in which the trolley 8 of the apparatus 1 bears a signaling device mounted thereon, the power cable 9 of the latter is constituted for example by at least one electrical cable in order to provide the electrical energy necessary for turning on the light sources (for example constituted by LEDs) of the device itself. The electrical cable in particular is provided with a first end electrically connected to the light sources of the device and with a second end connected to an electrical energy source.

In accordance with the second embodiment illustrated in FIGS. 4 and 5, in which the trolley 8 of the apparatus 1 bears an ignition device (pilot light) mounted thereon, the power cables 9 of the latter comprise for example a cable for providing the gas for feeding the flame of the ignition device; such cable is connected, at one end, to the device itself and, at the other end, to a combustible gas source on the ground. In addition, the power cables 9 of the ignition device comprise an electrical cable for power supplying and controlling electrical components of the device itself, such as an electric arc ignition component, connected to an electrical power supply and control unit placed on the ground.

Each power cable 9 of the devices 3 is made of flexible material in order to allow winding the cable on the ground (e.g. around a corresponding winding roller) when the device 3 is brought to the ground, and for unwinding the cable 9 substantially along the entire height of the tower 2 when the device 3 is brought to the top of the tower 2 itself. According to the invention, the apparatus 1 also comprises movement means 10 mechanically connected to the trolley 8 and actuatable for moving the latter to slide along the rail 4 between a raised position, in which the trolley 8 is placed at the upper end 6 of the rail 4 in order to arrange the device 3 at the top of the tower 2 (where the device 3 is intended to operate), and a lowered position, in which the trolley 8 is placed at the lower end 5 of the rail 4 in order to bring the device 3 to the ground or to an access position (for example in order to execute maintenance or repair operations). Multiple apparatuses 1 are advantageously installable on the tower 2, each apparatus provided with a corresponding rail 4 and corresponding trolley 8 in order to transport a corresponding device 3, as illustrated for example in the embodiment of FIG. 4.

In accordance with the idea underlying the present invention, the rail 4 of the apparatus 1 comprises at least one hollow shaped profile 11 with elongated form, which is longitudinally extended according to the guide direction X between a lower edge 12 thereof, which delimits a first opening 12', and an upper edge 13 thereof, which delimits a second opening 13'.

Each shaped profile 11 of the rail 4 is provided with an external surface 14 thereof and with an internal surface 15 thereof. The latter defines a guide seat 16 (being extended between the aforesaid openings 12', 13') in which the trolley 8 is slidably housed and in which the power cable 9 of the device 3 mounted on the trolley 8 itself is susceptible to pass.

In accordance with the embodiments illustrated in the enclosed figures, the rail 4 advantageously comprises multiple aforesaid shaped profiles 11 fixed to the tower 2 and arranged aligned with each other in succession along the guide direction X of the rail 4 itself. Preferably, each shaped profile 11 is positioned with its upper edge 13 slightly spaced from the lower edge 12 of the subsequent shaped profile 11, e.g. by about 10 mm, in order to compensate for the length variations of each profile 11 due to the thermal expansion.

Advantageously, each shaped profile 11 is connected to the subsequent profile by means of one or more alignment pins (not illustrated), inserted in corresponding holes obtained at the edges 12, 13 of the shaped profiles 11 in a manner so as to maintain the latter aligned with each other according to the guide direction X.

The shaped profiles 11 provided with aforesaid guide seat 16 according to the present invention allow, when the trolley 8 is in the raised position, substantially housing at their interior the entire power cable 9 of the device 3 to be transported and, therefore, protecting the power cable 9 from external weathering agents (such as wind, rain, etc.) which would easily lead to wear and breakage.

Advantageously, each shaped profile 11 is made of metal material, preferably aluminum, and is preferably obtained via extrusion.

Preferably, if the tower 2 is constituted by a smokestack or by a flare stack, the shaped profile 11 placed at the top of the tower 2 (i.e. the shaped profile 11 that defines the upper end 6 of the rail 4) is made of steel in order to ensure that the heat developed by the combustion of the gases expelled by the smokestack does not at all deteriorate the integrity of such shaped profile 11.

Advantageously, in accordance with the embodiment illustrated in FIG. 5, the shaped profile 11 at the upper end 6 of the rail 4 is positioned tilted with respect to the guide direction X, with the upper edge 13 of the shaped profile 11 closer to the tower 2 with respect to the lower edge 12, in a manner so as to bring the device 3 (constituted in such second embodiment by a pilot light) in proximity to the upper mouth of the tower 2, where the gases to be burned exit.

Advantageously, in accordance with the embodiments illustrated in the enclosed figures, the trolley 8 of the present apparatus 1 comprises a framework 17 preferably bearing a plurality of wheels 18 mounted thereon that are slidably engaged with the internal surface 15 of the shaped profiles 11 of the rail 4.

More in detail, the framework 17 of the trolley 8 is provided with at least one housing seat 19 adapted to contain, at its interior, at least one section of the power cable 9 of the device 3 mounted on the trolley 8 and in particular the end section of the cable 9 connected to the device 3 itself.

Figure 11:
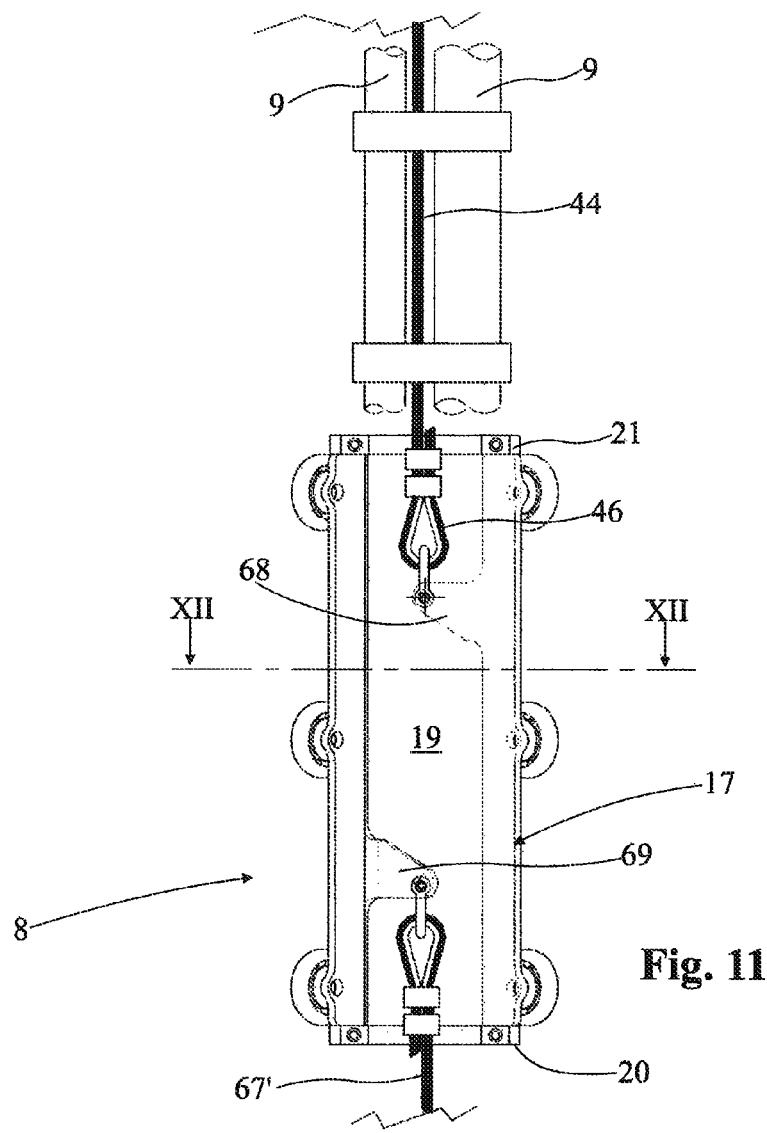
FIG. 11 shows a detail of the present apparatus relative to the trolley on which the device to be transported is mounted.
Figure 12:
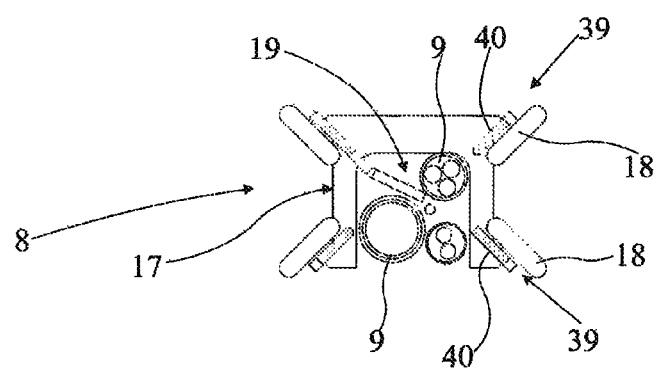
FIG. 12 shows a section view of the trolley illustrated in FIG. 11 along line XII-XII of FIG. 11 itself.
Figure 13:
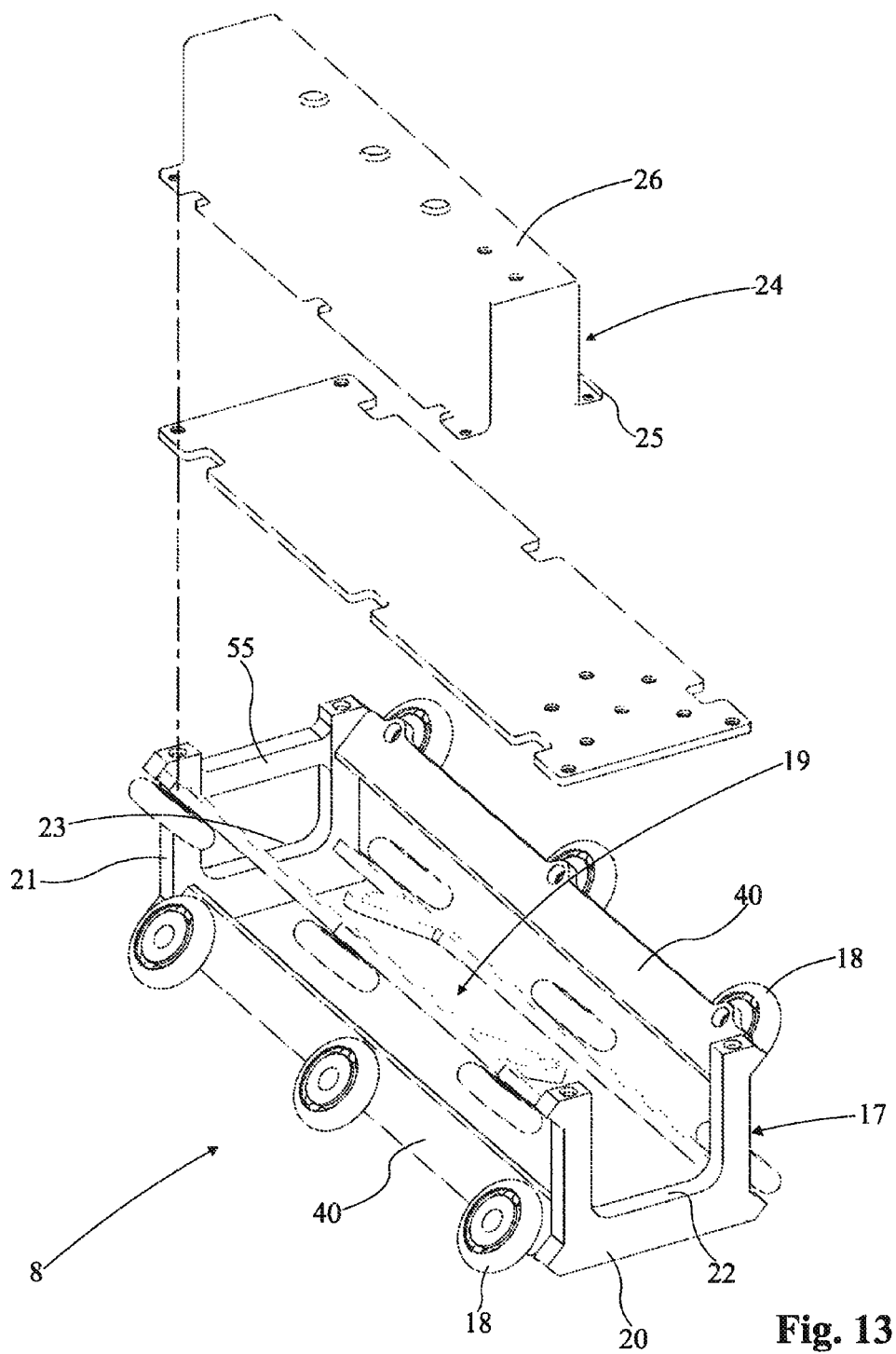
FIG. 13 shows a partially exploded view of the trolley illustrated in FIG. 11.

Preferably, in accordance with the embodiment illustrated in the FIGS. 11-13, the framework 17 of the trolley 8 is extended according to the guide direction X between a lower end part 20 thereof and an upper end part 21 thereof, respectively provided with a lower opening 22 and an upper opening 23 for the passage of the power cable 9 in the housing seat 19.

Advantageously, the trolley 8 of the apparatus 1 comprises a support bracket 24 fixed to the framework 17 of the trolley 8 and adapted to bear, fixed thereon, the corresponding device 3 to be transported.

More in detail, the aforesaid support bracket 24 is provided with a connection portion 25 fixed to the framework 17 of the trolley 8 (e.g. by means of fixing screws, not illustrated), and with a projecting portion 26 (to which the device 3 is fixed) being extended outside the guide seat 16 of the shaped profiles 11 through a longitudinal slit 27 obtained on each shaped profile 11, in a manner so as to support the device 3 positioned outside the guide seat 16 of the profiles 11 themselves.

Advantageously, the aforesaid longitudinal slit 27 is extended in a through manner between the lower edge 12 and the upper edge 13 of the corresponding shaped profile 11 according to the guide direction X of the rail 4, in a manner so as to allow the passage of the support bracket 24 of the trolley 8 during the sliding thereof between the lowered position and the raised position.

Figure 7:
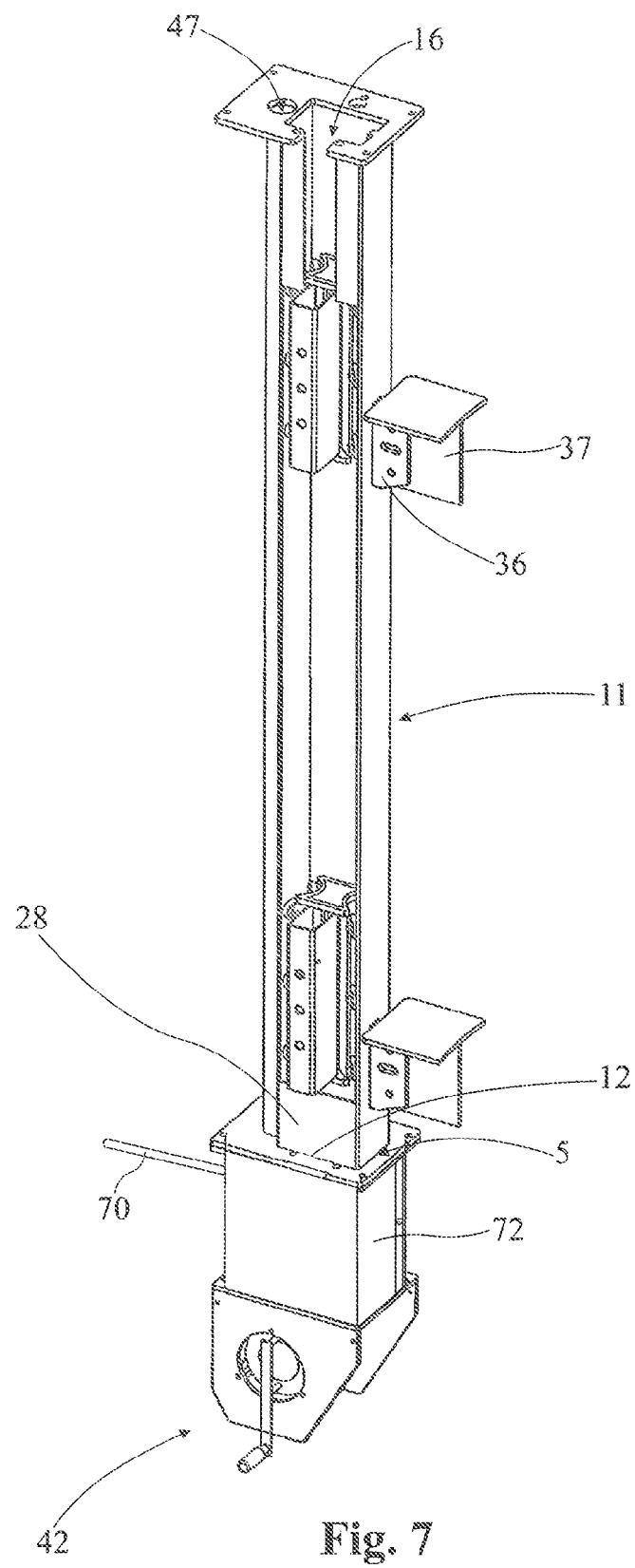
FIG. 7 shows a perspective view of a detail of the present apparatus, relative to the lower end of the rail of the apparatus itself, with some parts removed in order to better illustrate other parts.

Preferably, in accordance with the embodiment illustrated in FIG. 7, the shaped profile 11 placed at the lower end 5 of the rail 4 is provided, on the lower edge 12 thereof, with a first end stop portion 28 placed as a lower closure of the corresponding longitudinal slit 27 and adapted to receive in abutment the support bracket 24 of the trolley 8 when the latter is brought into the lowered position.

Figure 8:
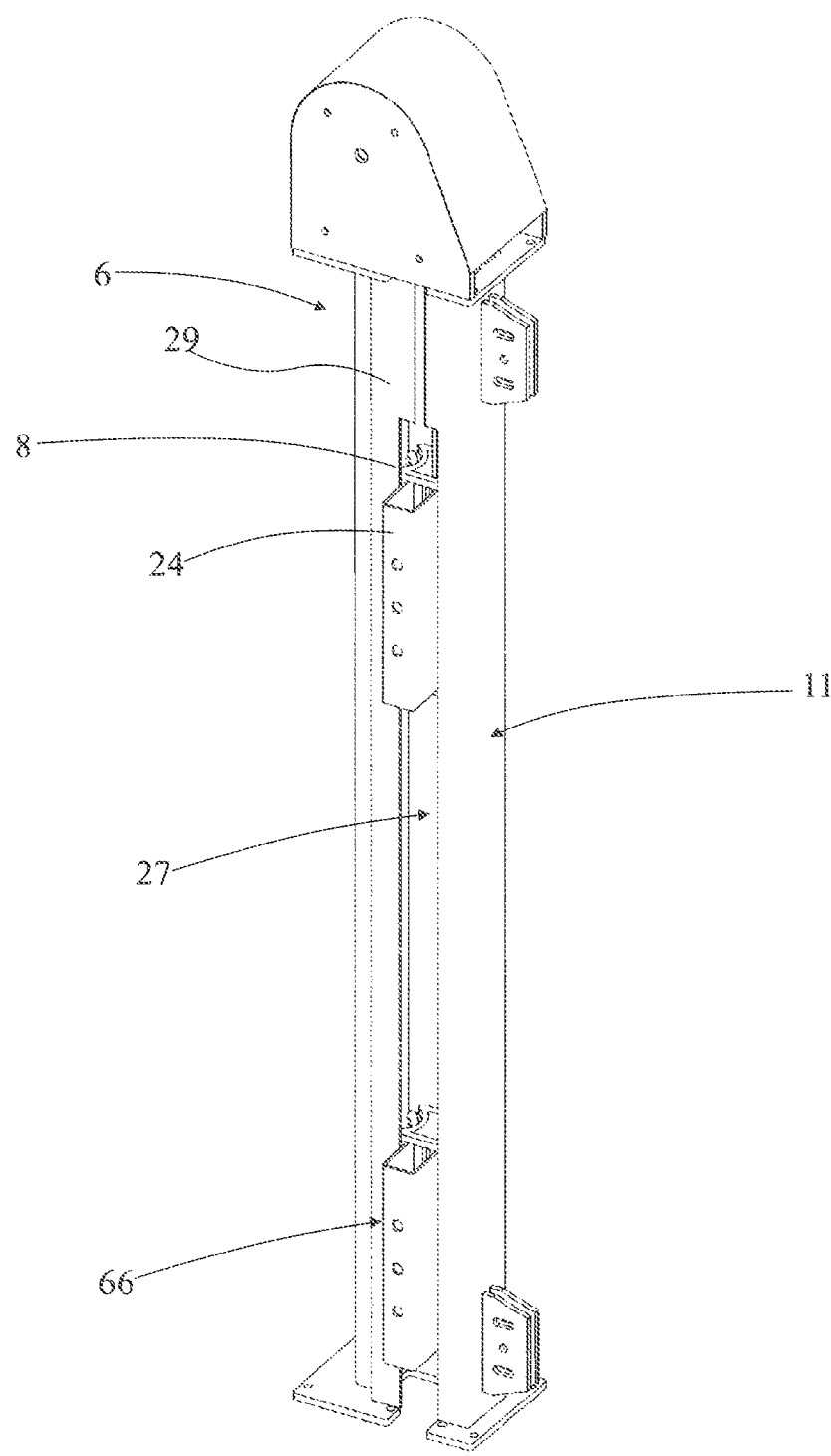
FIG. 8 shows a perspective view of a detail of the present apparatus, relative to the upper end of the rail of the apparatus itself, with some parts removed in order to better illustrate other parts.
Figure 9:
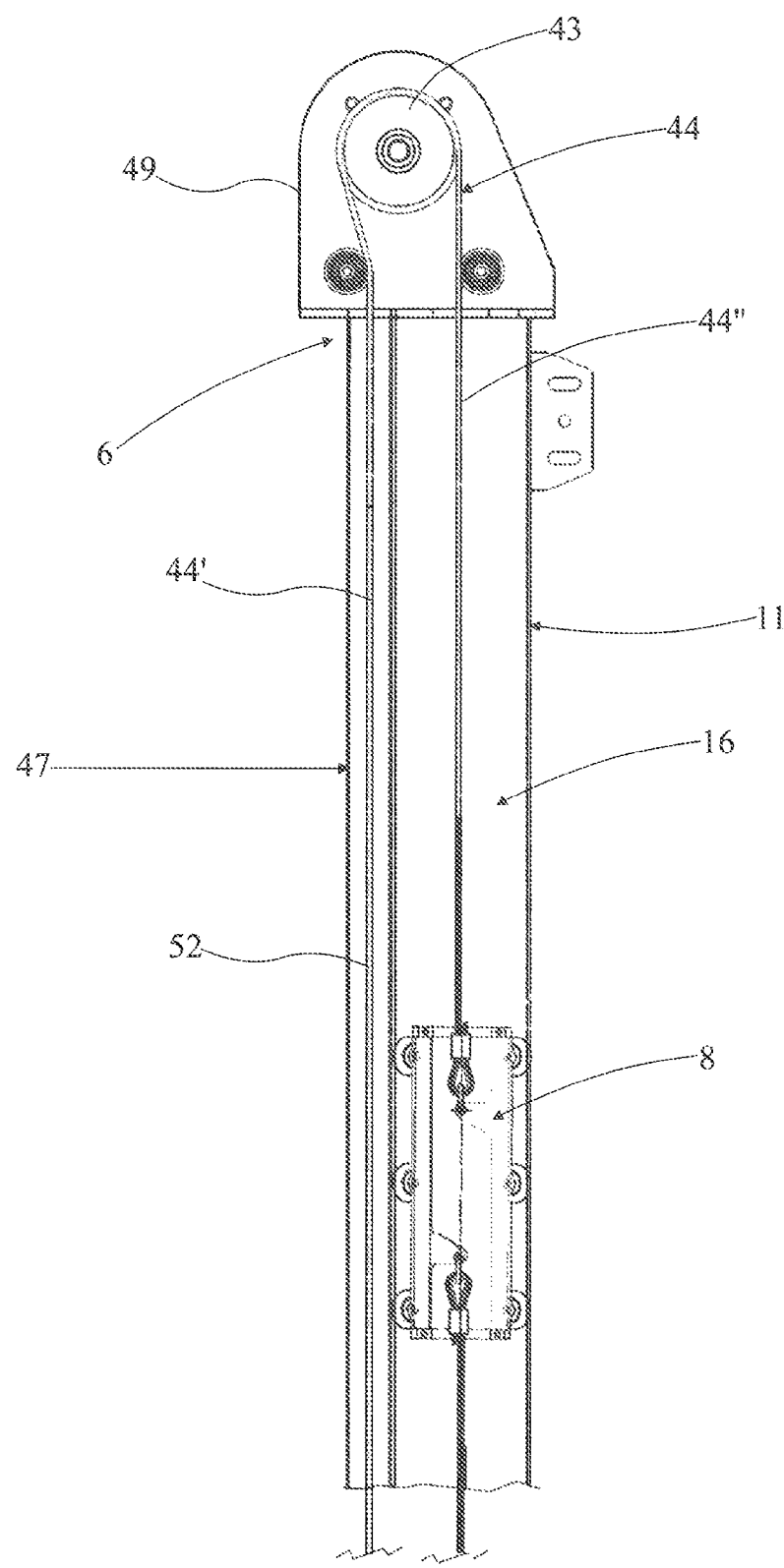
FIG. 9 shows a longitudinal section view of the detail of the apparatus illustrated in FIG. 8.

With reference to the embodiment illustrated in FIGS. 8 and 9, the shaped profile 11 placed at the upper end 6 of the rail 4 is advantageously provided, on the upper edge 13 thereof with a second end stop portion 29 placed as an upper closure of the corresponding longitudinal slit 27 and adapted to receive in abutment the support bracket 24 of the trolley 8 when the latter is brought into the raised position.

Figure 15:
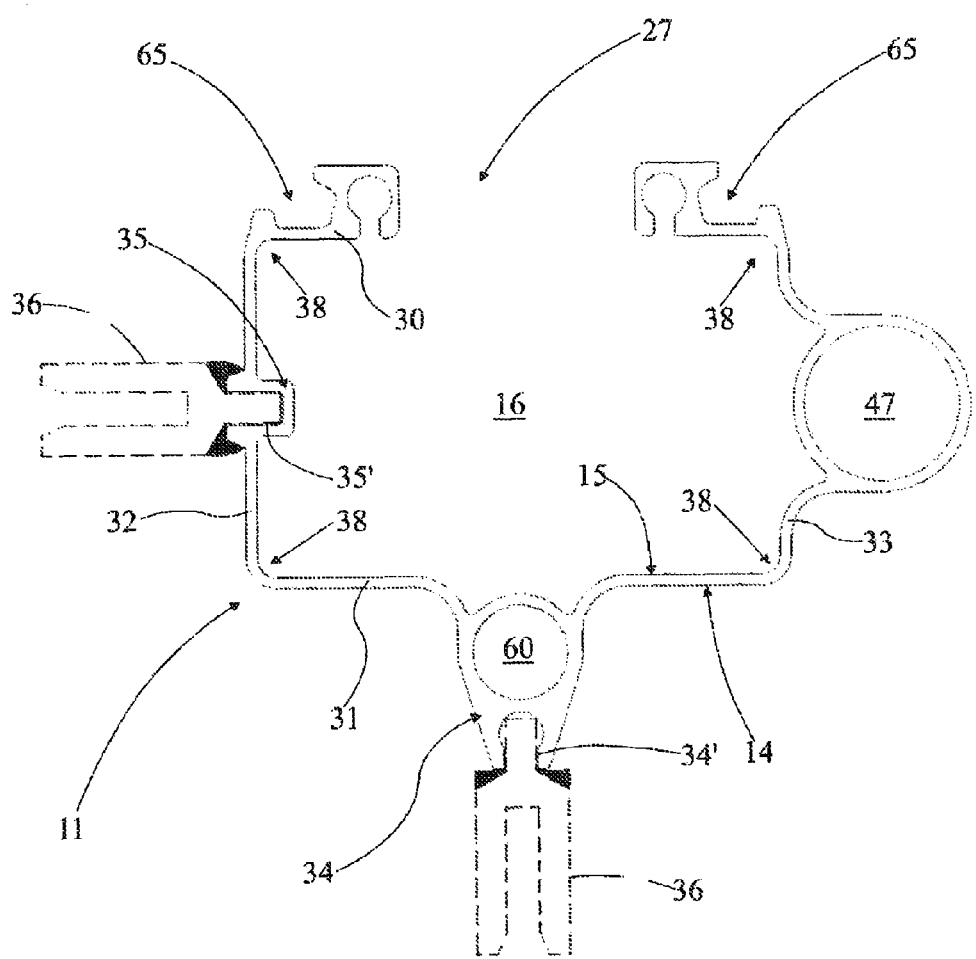
FIG. 15 shows a cross section view of the shaped profile of the rail illustrated in FIG. 14.

Advantageously, with reference to the embodiment illustrated in FIG. 15, each shaped profile 11 of the rail 4 has substantially quadrangular cross section and is provided with a front wall 30, on which the aforesaid longitudinal slit 27 is obtained, with a rear wall 31 substantially facing the front wall 30, and with a first and a second lateral wall 32, 33 placed to connect the front 30 and rear 31 walls.

Advantageously, the fixing means 7 of the rail 4, adapted to fix the latter to the tower 2, comprise a first connection portion 34 fixed to the external surface 14 of the rear wall 31 of each shaped profile 11, and a second connection portion 35 fixed to the external surface 14 of the first lateral wall 32 of the shaped profile 11 itself.

Each shaped profile 11 of the rail 4 is selectively fixed to the tower 2 by means of the first connection portion 34 (as illustrated in the embodiment of FIGS. 1-3) or by means of the second connection portion 35 (as illustrated in the embodiment of FIGS. 4-5) in a manner so as to arrange the device 3 supported by the trolley 8 respectively on the opposite side of the tower (with respect to the position of the rail 4) or alongside the tower 2 itself.

More in detail, with reference to the first embodiment illustrated in FIGS. 1-3, the shaped profiles 11 of the rail 4 are fixed to the tower 2 by means of their first connection portions 34, in a manner such that their front walls 30, at which the trolley 8 (0 supports the device 3, are directed in an opposite sense with respect to the tower 2 to ensure that the device 3 (advantageously constituted by the light signaling device) is more clearly visible to aircraft.

With reference to the second embodiment illustrated in FIGS. 4-5, the shaped profiles 11 of the rail 4 are fixed to the tower 2 (constituted by a smokestack) by means of their second connection portions 35, in a manner such that their front walls 30 (and thus the device 3 supported by the trolley 8) are arranged alongside the tower 2. In this manner, when the trolley 8 is in the raised position, the device 3 (advantageously constituted by the ignition device) is arranged adjacent to the mouth of the smokestack in order to facilitate the ignition of the gases expelled by the latter.

In accordance with the embodiment illustrated in FIG. 15, each connection portion 34, 35 of the shaped profiles 11 of the rail is provided with a longitudinal junction seat 34', 35' in which an anchorage plate 36 is selectively fixed, preferably via welding, which is in turn fixed, preferably by means of bolting, to an attachment bracket 37 anchored to the tower 2.

Preferably, the internal surface 15 of each shaped profile 11 has substantially polygonal section (in particular substantially rectangular section) and delimits four internal corners 38 of the corresponding guide seat 16 in which the trolley 8 is susceptible to slide.

Advantageously, with reference to the embodiment illustrated in FIGS. 11-13, the framework 17 of the trolley 8 has substantially parallelepiped form and is provided with at least four corners 39, along which corresponding rows of wheels 18 are arranged that are slidably engaged on the internal surface 15 of the shaped profile 11 at the respective internal corners 38 of the guide seat 16.

More in detail, advantageously, the framework 17 of the trolley 8 comprises four angular plates 40, defining the corresponding corners 39, and connected with each other by the aforesaid lower end 20 and upper end 21 parts of the framework 17.

Preferably, each angular plate is oriented according to the diagonal of the cross section of the trolley and bears, mounted thereon, the corresponding row of small wheels arranged aligned with each other according to the guide direction of the rail.

Advantageously, in accordance with the embodiment illustrated in FIGS. 6-9, the movement means 10 (which actuate the trolley 8 to slide along the rail 4 between its lowered position and raised position) comprise a pulley 41, which is provided with an actuation device 42 arranged at the lower end 5 of the rail 4, with a transmission pulley 43 fixed at the upper end 6 of the rail 4, and with a drive rope 44 supported on the transmission pulley 43.

The drive rope 44 of the pulley 41 is provided with a first end 45 fixed to the actuation device 42 and with a second end 46 fixed to the trolley 8.

The actuation device 42 can be actuated by an operator in order to move the drive rope 44, for the purpose of making the trolley 8 slide along the rail 4.

More in detail, in accordance with the embodiment illustrated in FIG. 7, the actuation device 42 of the pulley 41 advantageously comprises a winch provided with a winding drum, to which the first end 45 of the drive rope 44 is connected.

The drum of the winch can be actuated by means of a motor or manually (e.g. through a crank) to rotate in order to unwind or wind the drive rope 44 so as to respectively lower or raise the trolley 8.

In particular, the drive rope 44 of the pulley 41 is provided with a first section 44' being extended parallel to the guide direction X of the rail 4 between the actuation device 42 and the transmission pulley 43, and with a second section 44" being extended parallel to the guide direction X between the transmission pulley 43 and the trolley 8.

Advantageously, each shaped profile 11 of the rail 4 is provided with a first passage seat 47, which is extended according to the guide direction X in a through manner between the lower edge 12 and the upper edge 13 of the corresponding shaped profile 11, and houses therein the first section 44' of the drive rope 44 (which is extended between the actuation device 42 and the transmission pulley 43) in a manner so as to protect such first section 44' of the drive rope 44.

Preferably, the first passage seat 47 of each shaped profile 11 is situated outside the guide seat 16 in which the trolley 8 is susceptible to slide.

With reference to the particular embodiment illustrated in FIG. 15, the first passage seat 47 is positioned on the second lateral wall 33 of the corresponding shaped profile 11, which in particular is positioned on the side opposite that of the first lateral wall 32, on which the second connection portion 35 of the fixing means 7 of the rail 4 is positioned.

Preferably, the second section 44" of the drive rope 44 is housed inside the guide seat 16 of the shaped profiles 11 of the rail 4, in a manner no as to protect such second section 44" from weathering agents.

Advantageously, the apparatus that is the subject of the present invention comprises a coupling device 48 arranged at the upper end 6 of the rail 4 and actuatable to be engaged with the framework 17 of the trolley 8 when the latter is brought into the raised position in order to support the trolley 8 and the corresponding device 3, without the weight of the latter being unloaded on the drive rope 44 of the pulley 41 of the movement means 10.

Figure 10:
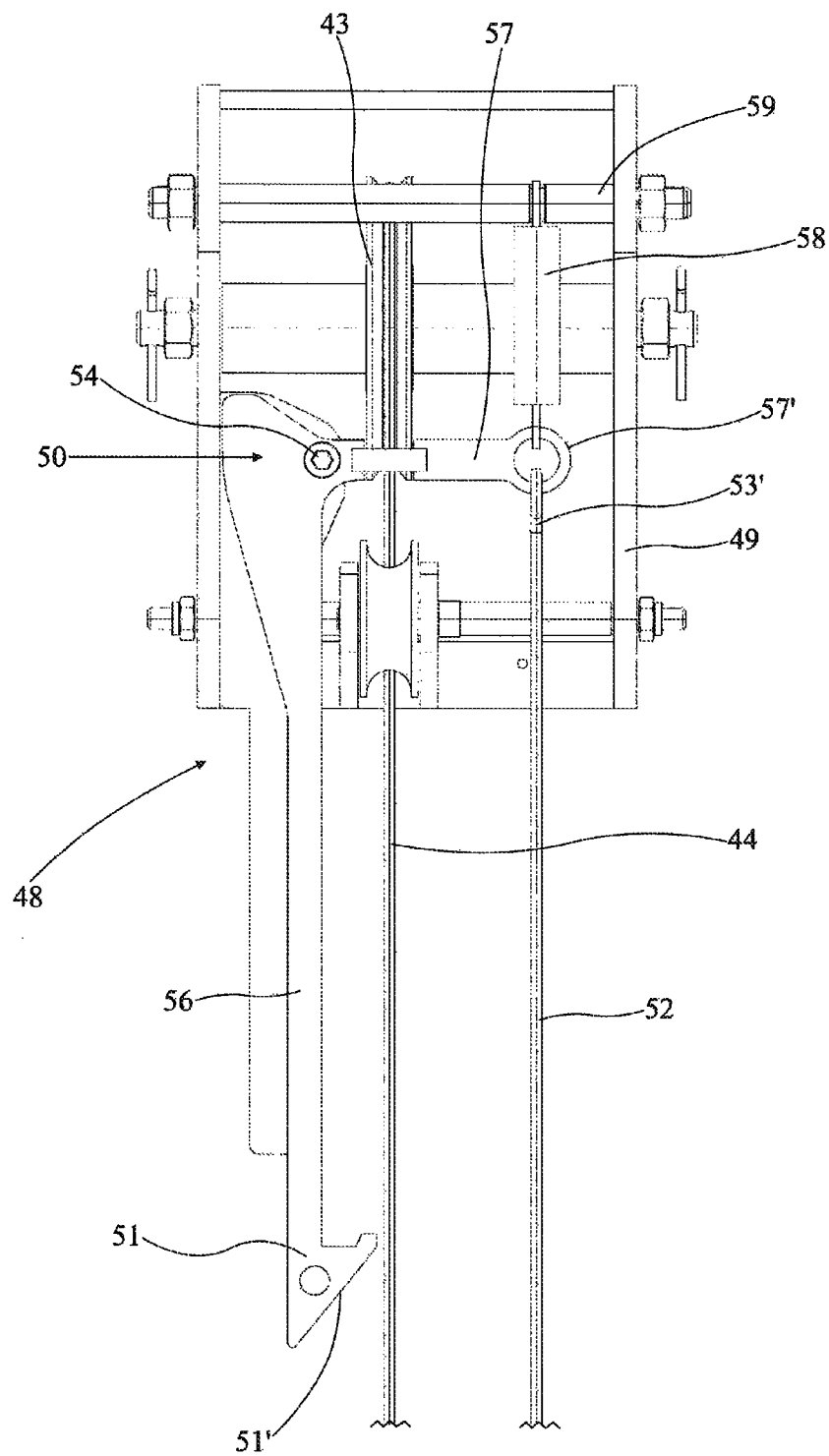
FIG. 10 shows a detail of the present apparatus relative to a coupling device placed at the upper end of the rail, with some parts removed in order to better illustrate other parts.

Preferably, in accordance with the embodiment illustrated in FIG. 10, the aforesaid coupling device 48 comprises a support body 49, integral with the rail 4 of the apparatus 1, and a lever 50 pivoted, by means of a first pin 54, to such support body 49 and provided with a hook-shaped retention end 51 and adapted to be engaged with the trolley 8 when the latter is brought into the raised position.

In addition, the coupling device 48 comprises an actuation rope 52 being extended parallel to the guide direction X of the rail 4 between an (upper) third end 53' thereof, constrained to the lever 50, and a (lower) fourth end 53" thereof positioned at the lower end 5 of the rail 4 and advantageously constrained to a release lever 70 on which an operator can operate in order to rotate the lever 50 in a manner so as to release the retention end 51 of the latter from the trolley 8 (as described hereinbelow).

In operation, the lever 50 of the coupling device 48 can be actuated to rotate around its first pin 54 between a coupling position, in which the retention end 51 of the lever 50 is susceptible to interfere with the trolley 8 in order to be engaged with the framework 17 thereof, and a release position, in which the retention end 51 of the lever 50 is rotated away from the trolley 8 in order to be uncoupled therefrom.

Advantageously, the framework 17 of the trolley 8 comprises a grip portion 55 susceptible of being engaged with the retention end 51 of the lever 50 of the coupling device 48 and preferably placed at the upper end part 21 of the framework 17 of the trolley 8, in particular to partially delimit the upper opening 23 of the trolley 8 itself.

Advantageously, the support body 49 of the coupling device 48 is fixed to the upper end 6 of the rail 4 and preferably comprises a cover casing, inside which the lever 50 is partially housed.

In particular, within the casing of the support body 49, transmission pulley 43 of the pulley 41 of the movement means 10 is housed.

In particular the lever 50 of the coupling device 48 comprises a first arm 56 provided with the aforesaid retention end 51 and being extended with such retention end 51 within the shaped profile 11 of the rail 4 in order to be engaged with the trolley 8 when the latter is brought into the raised position.

In addition, the lever 50 is provided with a second arm 57, arranged tilted with respect to the first 56, preferably by about 90°, and at whose free end 57' the third end 53 of the actuation rope 52 of the coupling device 48 is constrained.

In particular, the second arm 57 of the lever 50 is provided with a through hole through which the drive rope 44 of the pulley 41 passes, in a manner such that such second arm 57 does not block the movement of the drive rope 44 itself.

Preferably, the coupling device 48 comprises a spring 58, in particular helical, constrained at a first end thereof to the free end 57' of the second arm 57 of the lever 50 and, at a second end thereof, to the support body 49, and adapted to pull the lever 50 in order to rotate it into the coupling position.

In particular, the spring 58 is hung with its second end on a support rod 59 fixed to the support body 49 of the coupling device 48 and positioned above the second arm 57 of the lever 50.

Advantageously, the retention end 51 of the first arm 56 of the lever 50 is provided with a tapered surface 51', against which the grip portion 55 of the trolley 8 is susceptible to abut when the latter is brought into the raised position.

In operation, the action of abutment of the trolley 8, against the tapered surface 51' on the retention end 51 of the first arm 56, overcomes the elastic force of the spring 58 and brings the lever 50 to rotate towards the release position until the grip portion 55 of the trolley 8 passes beyond the retention end 51. Then, the spring 58 brings the lever 50 back into the coupling position, with the hook-shaped retention end 51 that is inserted below the grip portion 55 of the framework 17 of the trolley 8. In this manner, the grip portion 55 of the trolley 8 comes to abut against the retention end 51 of the lever 50, which therefore supports the trolley 8 in the raised position, freeing the drive rope 44 of the pulley 41 from the weight of the trolley 8 itself and the device 3 mounted thereon.

Figure 17:
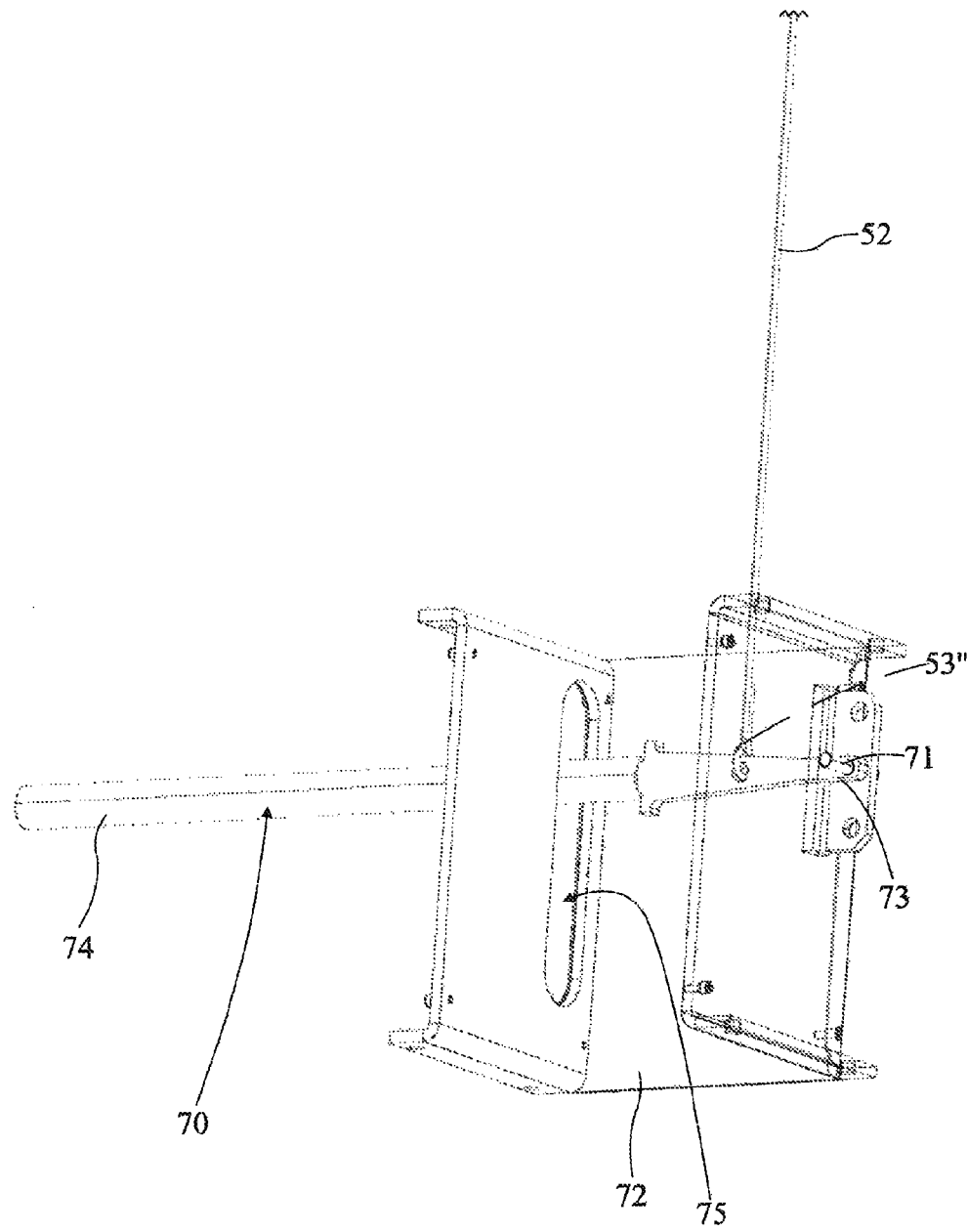
FIG. 17 shows a detail of the apparatus illustrated in FIG. 7, relative to a release lever that can be actuated in order to free the trolley from the coupling device (illustrated in FIG. 10), with some parts removed in order to better illustrate other parts.

In accordance with the embodiment illustrated in FIG. 17, the release lever 70 of the coupling device 48 (to which the lower fourth end 53" of the actuation rope 52 is constrained) is pivoted, by means of a second pin 71, to a support frame 72 advantageously fixed to the lower end 5 of the rail 4 and preferably arranged between such lower end 5 and the actuation device 42 of the pulley 41 of the apparatus 1.

In particular, the support frame 72 comprises a fully hollow box-like body that is open at the top and bottom in order to allow the passage of the drive rope 44 of the pulley 41 connected to the underlying actuation device 42 of the pulley 41 itself.

The release lever 70 is partially extended within the box-like body of the support frame 72 and is provided with one constrained end 73, hinged by means of the second pin 71 to the support frame 72, and with an opposite grip end 74 being extended outside the box-like body of the frame 72 through a passage opening 75 obtained on a lateral wall of the box-like body itself.

The fourth end 53" of the actuation rope 52 is fixed to a section of the release lever 70 arranged between the constrained end 73 and the grip end 74 and preferably positioned inside the box-like body of the support frame 72.

In operation, in order to disengage the trolley 8 from the coupling device 48, the operators must operate on the grip end 74 of the release lever 70, rotating the latter downward, in a manner such to pull the actuation rope 52 downward in order to rotate the lever 50 from the coupling position to the release position. Subsequently, by actuating the winch of the pulley 41, it is possible to bring the trolley 8 back to the ground.

Advantageously, each shaped profile 11 of the rail 4 is provided with a second passage seat 60, which is extended according to the guide direction X in a through manner between the lower edge 12 and the upper edge 13 of the corresponding shaped profile 11 and houses therein the actuation rope 52 of the aforesaid coupling device 48, in this manner, the actuation rope 52 is protected from the weathering agents with consequent reduction of the factors of wear and damage of the rope 52 itself.

In accordance with the embodiment illustrated in FIG. 15, the second passage seat 60 of each shaped profile 11 is obtained on the rear wall 31 of the shaped profile 11 itself.

Advantageously, the apparatus, subject of the present invention, comprises at least one dimensional constraining element 61 wound around the external surface 14 of the corresponding shaped profile 11 of the rail 4, in order to limit the deformation of the transverse shape of the shaped profile 11 itself.

More in detail, each dimensional constraining element 61 is provided with an internal perimeter edge 62 substantially counter-shaped with respect to the cross section of the external surface 14 of the corresponding shaped profile 11, and placed substantially adjacent to such external surface 14 in order to prevent expansions via deformation of the shaped profile 11.

Figure 16:
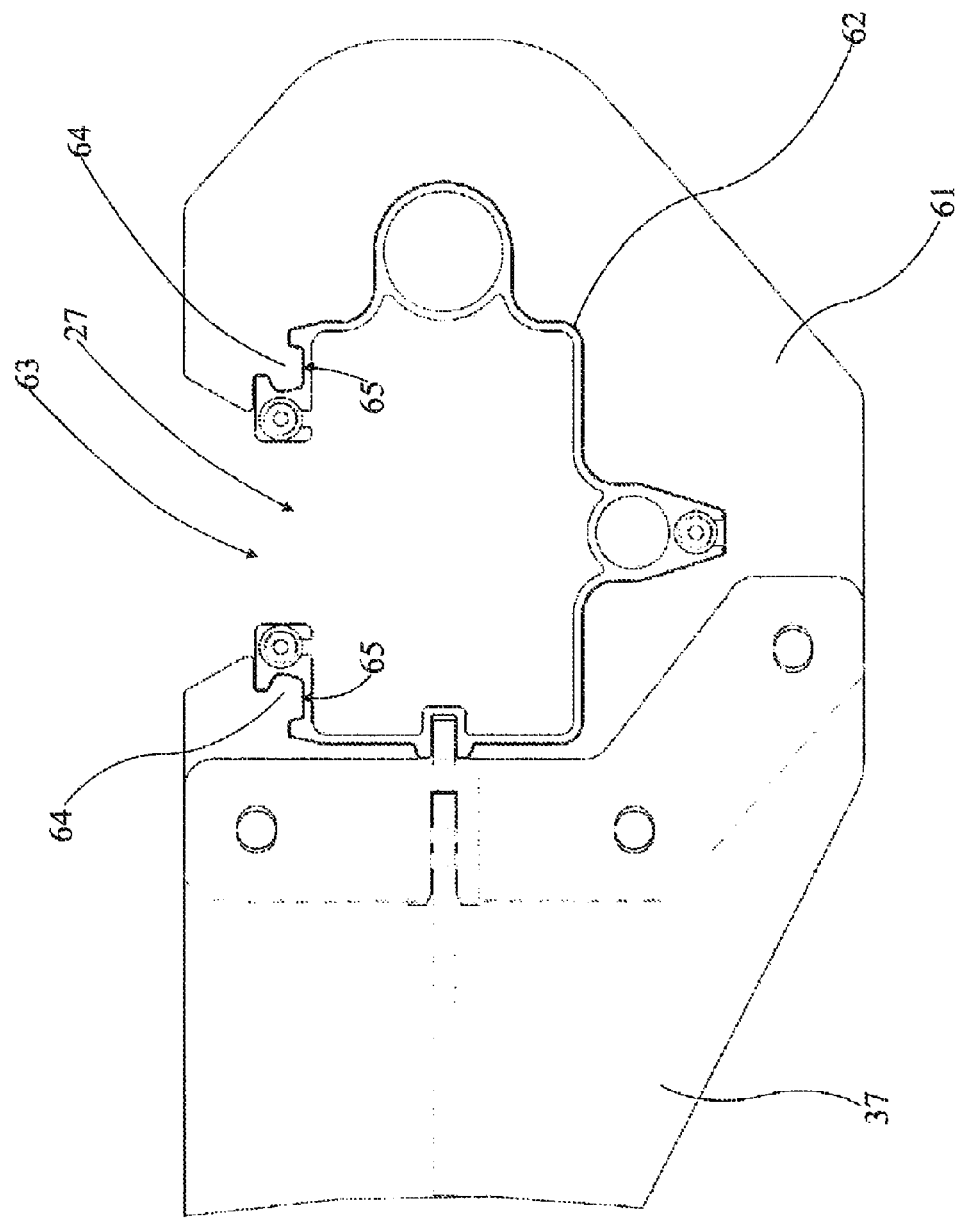
FIG. 16 shows a plan view of a detail of the shaped profile of the rail illustrated in FIG. 14, relative to a constraining element of the shaped profile itself.

In accordance with the embodiment illustrated in FIG. 16, each constraining element 61 is extended around the corresponding shaped profile 11 with a substantially C-shaped form, and is provided with a lateral opening 63 placed across from the longitudinal slit 27 of the corresponding shaped profile 11 in order to allow the passage of the support bracket 24 of the trolley 8.

Advantageously, each constraining element 61 comprises a metal plate, positioned on a plane substantially orthogonal to the guide direction X of the rail 4 and preferably made of aluminum.

Advantageously, the internal perimeter edge 62 of each constraining element 61 is provided with at least one shaped appendage 64 inserted in a retention relation in a corresponding shaped seat 65 obtained on the external surface 14 of the corresponding shaped profile 11.

In particular, still with reference to the embodiment illustrated in FIG. 16, each constraining element 61 is provided with two aforesaid shaped appendages 64, placed at the edges of the lateral opening 63, and inserted in two corresponding shaped seats 65 placed in proximity to the edges of the longitudinal slit 27 of the corresponding shaped profile 11.

In this manner, each constraining element 61, by means of its shaped appendages 64, prevents the narrowing of the transverse shape of the corresponding shaped profile 11, substantially preventing the edges of the longitudinal slit 27 of the shaped profile 11 from approaching each other.

Figure 14:
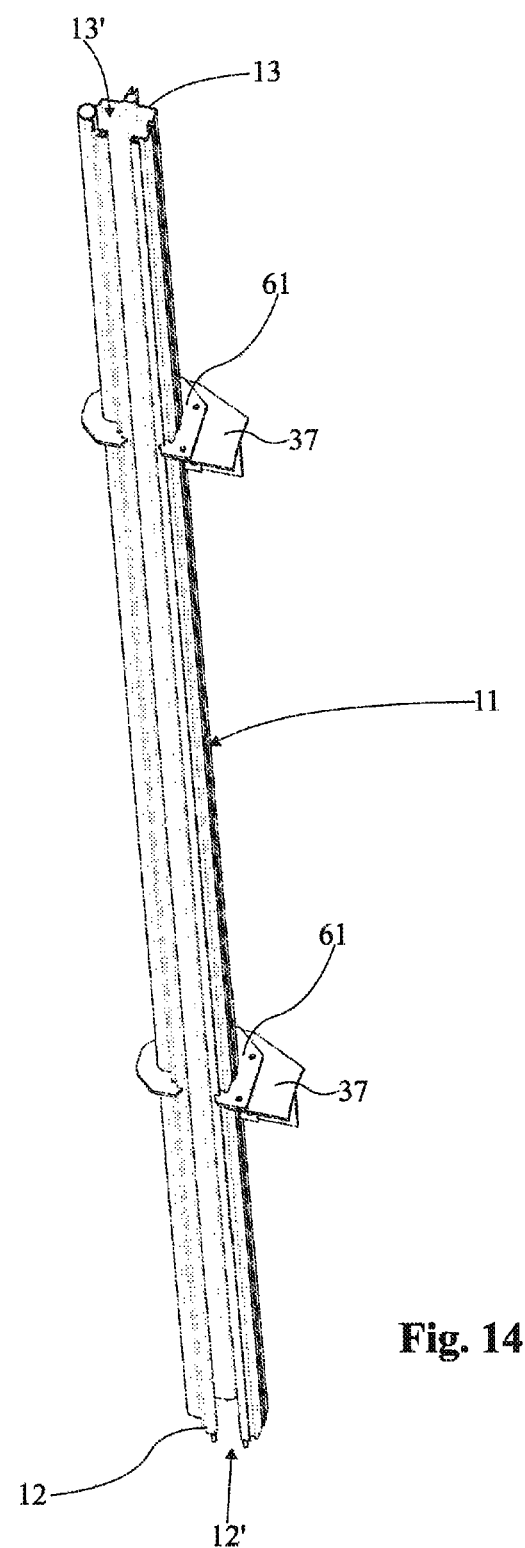
FIG. 14 shows a detail of the present apparatus relative to a shaped profile of the rail.

In accordance with the embodiment illustrated in FIG. 14, on each shaped profile 11, multiple constraining elements 61 are mounted (e.g. two) that are spaced from each other along the longitudinal extension of the shaped profile 11 itself.

Advantageously, each constraining element 61 is fixed, preferably via bolting, to the corresponding connection bracket 37 by means of which the shaped profile 11 is fixed to the tower 2.

The shaped profiles 11 of the apparatus 1 according to the present invention allow obtaining the rail 4 by means of profiles made of aluminum, preferably extruded, allowing considerable production cost savings with respect to the rails made of iron or steel of the apparatuses of known type, commented on above.

In particular, the constraining elements 61 confer to the shaped profiles 11 a suitable dimensional stability, and more generally a mechanical resistance to deformations, especially due to thermal expansion, ensuring the regular sliding of the trolley 8 in the guide seat 16 of the shaped profiles 11.

Figure 6:
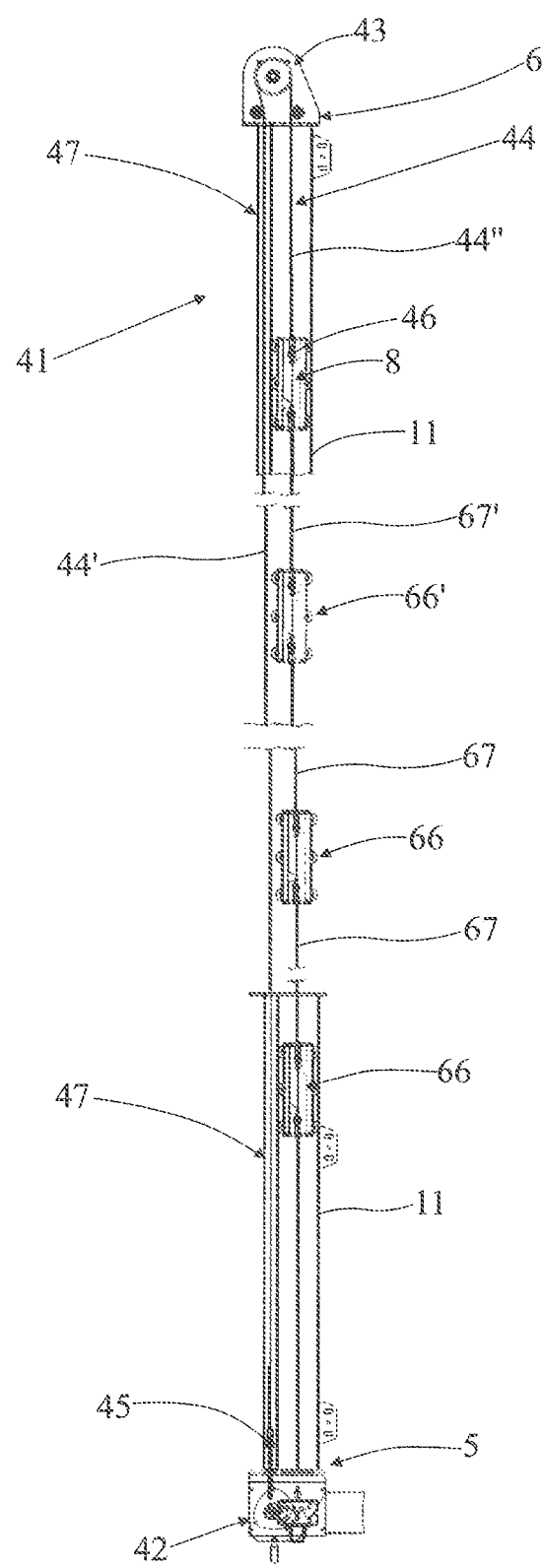
FIG. 6 shows a longitudinal section view of the apparatus, subject of the present invention, with some sections of the rail of the apparatus removed in order to better illustrate other parts of the apparatus itself.

Advantageously, in accordance with the embodiment illustrated in FIG. 6, the present apparatus 1 comprises multiple auxiliary trolleys 66 arranged in succession one after the other in the guide seat 16 of the shaped profiles 11 of the rail 4 and positioned below the aforesaid trolley 8 that bears, mounted thereon, the device 3 to be transported along the tower 2. Such auxiliary trolleys 66 are connected to each other by means of a corresponding connection rope 67.

In particular, the first auxiliary trolley 66' of the succession (placed higher) is connected to the trolley 8 on which the device 3 is mounted, by means of a corresponding head connection rope 67'.

Advantageously, in accordance with the embodiment illustrated in FIG. 11, the framework 17 of the trolley 8 is provided with a first coupling appendage 68 to which the second end 46 of the drive rope 44 of the pulley 41 is fixed, and with a second coupling appendage 69 to which the head connection rope 67' is fixed.

Preferably, the aforesaid coupling appendages 68, 69 are projectingly extended within the housing seat 19 of the framework 17 of the trolley 8, and are fixed, in particular integrally, with the corresponding angular plates 40 of the framework 17 itself.

Advantageously, the auxiliary trolleys 66, 66' of the apparatus have structural characteristics that are substantially identical to those of the trolley 8 on which the device 3 is mounted.

Each auxiliary trolley 66, 66' is provided with a corresponding auxiliary housing seat, which advantageously is substantially equivalent to the housing seat 19 of the trolley 8, and is traversed by the power cable 9 of the device 3 mounted on the trolley 8, in a manner such to limit the oscillations of the power cable 9 itself thus preventing strong impact against the tubular profiles and thus preventing damage of the same power cable. Preferably, the auxiliary trolleys 66, 66' do not bear any device mounted thereon; rather, they only perform the aforesaid function of guiding the power cable 9 of the device 3 mounted on the trolley 8.

The invention thus conceived therefore attains the pre-established objects.

The invention claimed is:

1. Apparatus for transporting a device along a tower, which comprises:
    at least one rail, which is extended, according to a substantially rectilinear guide direction (X), between a lower end thereof and an upper end thereof, and is provided with fixing elements by means of which said rail is susceptible of being fixed to the tower with said upper end placed at a top of said tower;
    at least one trolley slidably constrained to said rail, and adapted to support the device to be transported provided with at least one power cable;
    movement system mechanically connected to said trolley and actuatable to move said trolley to slide along said rail between a lowered position, in which said trolley is placed at the lower end of said rail, and a raised position, in which said trolley is placed at the upper end of said rail in order to arrange said device at the top of said tower;
said rail comprising at least one hollow shaped profile with elongated form, which is longitudinally extended according to said substantially rectilinear guide direction (X) between a lower edge thereof and an upper edge thereof, and is provided with an external surface and an internal surface which defines a guide seat in which said trolley is slidably housed and in which the power cable of said device is susceptible to pass;
wherein said trolley comprises a support bracket provided with a projecting portion to which said device is susceptible to be fixed; said projecting portion being extended outside the guide seat of said hollow shaped profile through a longitudinal slit obtained on said hollow shaped profile and being extended parallel to said substantially rectilinear guide direction (X);

wherein said movement system comprises at least one pulley provided with an actuation device arranged at the lower end of said rail, with a transmission pulley fixed at the upper end of said rail, and with a drive rope supported on said transmission pulley, and provided with a first end constrained to said actuation device and with a second end fixed to said trolley; said drive rope being provided with a first section being extended parallel to said substantially rectilinear guide direction (X) between said actuation device and said transmission pulley, and with a second section being extended parallel to said substantially rectilinear guide direction (X) between said transmission pulley and said trolley; wherein the hollow shaped profile of said rail is provided with at least one first passage seat being extended in a through manner between the lower edge and the upper edge of said hollow shaped profile according to said substantially rectilinear guide direction (X), and housing therein the first section of said drive rope.

2. Apparatus according to claim 1, wherein said trolley comprises a framework provided with at least one housing seat adapted to contain, at its interior, at least one section of the power cable for said device.

3. Apparatus according to claim 1, comprising at least one coupling device arranged at the upper end of said rail and actuatable to be engaged with said trolley in said raised position.

4. Apparatus for transporting a device along a tower, which comprises:
at least one rail, which is extended, according to a substantially rectilinear guide direction (X), between a lower end thereof and an upper end thereof, and is provided with fixing elements by means of which said rail is susceptible of being fixed to the tower with said upper end placed at a top of said tower;
at least one trolley slidably constrained to said rail, and adapted to support the device to be transported provided with at least one power cable;
movement system mechanically connected to said trolley and actuatable to move said trolley to slide along said rail between a lowered position, in which said trolley is placed at the lower end of said rail, and a raised position, in which said trolley placed at the upper end of said rail in order to arrange said device at the top of said tower;
said rail comprising at least one hollow shaped profile with elongated form, which is longitudinally extended according to said substantially rectilinear guide direction (X) between a lower edge thereof and an upper edge thereof, and is provided with an external surface and an internal surface which defines a guide seat in which said trolley is slidably housed and in which the power cable of said device is susceptible to pass;
wherein said trolley comprises a support bracket provided with a projecting portion to which said device is susceptible to be fixed; said projecting portion being extended outside the guide seat of said hollow shaped profile through a longitudinal slit obtained on said hollow shaped profile and being extended parallel to said substantially rectilinear guide direction (X);
wherein the apparatus comprises at least a coupling device arranged at the upper end of said rail and actuatable to be engaged with said trolley in said raised position;
wherein said coupling device comprises a support body fixed to said rail, a lever pivoted to said support body and provided with a hook-shaped retention end adapted to be engaged with said trolley, and an actuation rope being extended parallel to said substantially rectilinear guide direction (X) and provided with a third end fixed to said lever and a fourth end positioned at the lower end of said rail;
said hollow shaped profile being provided with a second passage seat being extended in a through manner between the lower edge and the upper edge of said hollow shaped profile according to said substantially rectilinear guide direction (X), and housing at its interior the actuation rope of said coupling device.

5. Apparatus for transporting a device along a tower, which comprises:
at least one rail, which is extended, according to a substantially rectilinear guide direction (X), between a lower end thereof and an upper end thereof, and is provided with fixing elements by means of which said rail is susceptible of being fixed to the tower with said upper end placed at a top of said tower;
at least one trolley slidably constrained to said rail, and adapted to support the device to be transported provided with at least one power cable;
movement system mechanically connected to said trolley and actuatable to move said trolley to slide along said rail between a lowered position, in which said trolley is placed at the lower end of said rail, and a raised position, in which said trolley is placed at the upper end of said rail in order to arrange said device the top of said tower;
said rail comprising at least one hollow shaped profile with elongated form, which is longitudinally extended according to said substantially rectilinear guide direction (X) between a lower edge thereof and an upper edge thereof, and is provided with an external surface and an internal surface which defines a guide seat in which said trolley is slidably housed and in which the power cable of said device is susceptible to pass;
wherein said trolley comprises a support bracket provided with a projecting portion to which said device is susceptible to be fixed; said projecting portion being extended outside the guide seat of said hollow shaped profile through a longitudinal slit obtained on said hollow shaped profile and being extended parallel to said substantially rectilinear guide direction (X);
wherein the hollow shaped profile of said rail is provided with a front wall, on which said longitudinal slit is obtained, with a rear wall substantially facing said front wall, and with a first and a second lateral wall placed to connect said front and rear walls;
the fixing elements of said rail comprising a first connection portion fixed to the external surface of the rear wall of said hollow shaped profile, and a second connection portion fixed to the external surface of the first lateral wall of said hollow shaped profile.

6. Apparatus according to claim 1, comprising at least a dimensional constraining element placed around the external surface of said hollow shaped profile.

7. Apparatus according to claim 6, wherein said constraining element is provided with an internal perimeter edge substantially counter-shaped with respect to the cross section of the external surface of said hollow shaped profile and placed substantially adjacent to said external surface.

8. Apparatus according to claim 7, wherein the internal perimeter edge of said constraining element is provided with at least one shaped appendage inserted in a retention relation in a corresponding shaped seat obtained on the external surface of said hollow shaped profile.

9. Apparatus according to claim 1, comprising multiple auxiliary trolleys, which are arranged in succession one after the other in the guide seat of said at least one hollow shaped profile, are positioned below said trolley and are connected to each other by means of a corresponding connection rope; said auxiliary trolleys comprising a first auxiliary trolley connected to said trolley by means of a corresponding head connection rope.

10. Apparatus according to claim 9, wherein each said auxiliary trolley is provided with a corresponding auxiliary housing seat susceptible of being traversed by the power cable of said device.

\* \* \* \* \*